(No Model.)

W. BAILEY.
WHIFFLETREE CIRCLE.

No. 328,998. Patented Oct. 27, 1885.

WITNESSES:
P. Bartow
Richard E. Evans

INVENTOR.
William Bailey

UNITED STATES PATENT OFFICE.

WILLIAM BAILEY, OF NEW HARTFORD, NEW YORK.

WHIFFLETREE-CIRCLE.

SPECIFICATION forming part of Letters Patent No. 328,998, dated October 27, 1885.

Application filed October 11, 1883. Serial No. 108,704. (No model.)

*To all whom it may concern:*

Be it known that I, WILLIAM BAILEY, a citizen of the United States, residing at the town of New Hartford, in the county of Oneida and State of New York, have invented a certain new and useful Improvement in Whiffletree-Circles; and I do hereby declare the following to be a full, clear, and exact description of the invention, which will enable others skilled in the art to which it relates to make and use the same.

Heretofore whiffletree-circles have been provided with projecting arms upon each side of the circle opposite to each other, provided with screw or bolt holes to fasten the same to the whiffletree and cross-bar or evener, and so adjusted as to fit closely into each other, forming a circular bearing between the whiffletree and cross-bar or evener, to prevent wear. The whiffletree and cross-bar or evener are then fastened together by passing a bolt through the whiffletree, evener, or cross-bar, through the center of the circle, and provided with a nut upon the under side, thus forming a flexible joint, provided with circular iron bearings attached to the parts, as before stated. These circles are dangerous, for frequently the bolt becomes loose or broken, allowing the whiffletree to become detached and the horse to go forward, thus allowing the shafts or tongue to drop to the ground, causing damage to the wagon and its occupants.

The object of my invention and improvement is to provide, in a secure manner, the means of fastening the circle independent of the center-bolt, and at the same time to provide a flexible joint to allow the whiffletree sufficient play, and to provide a check to prevent too much play of the whiffletree. I attain this object by means illustrated in the accompanying drawings, in which—

Figure 4:
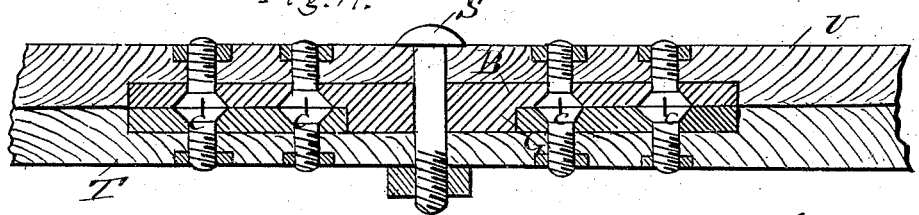
Figures 3, 5:
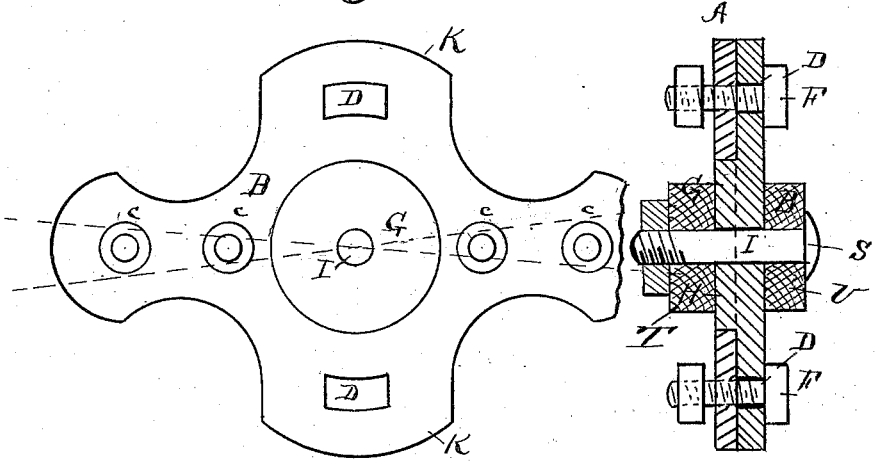
Figure 1:
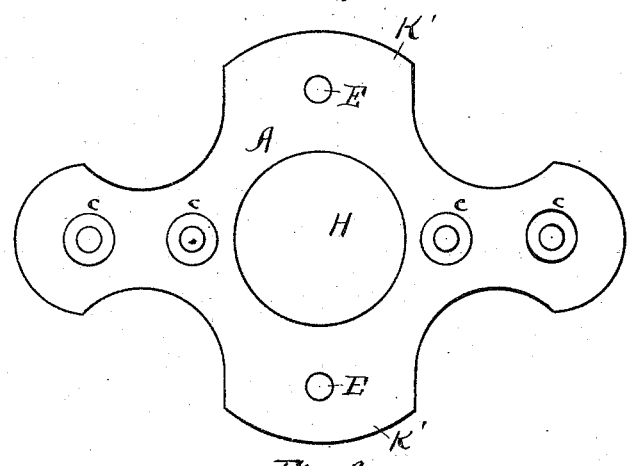
Figure 2:
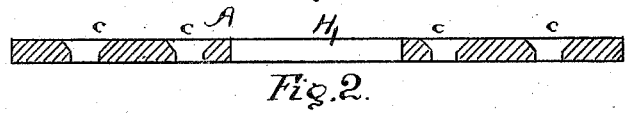

Figure 1 represents a full-size front view of the upper half of the circle. Fig. 2 represents a cross-section of the same. Fig. 3 represents a full-size front view of the bottom half of the circle. Fig. 4 represents a cross-section of the same, showing the centre bolt, one whiffletree broken away, and a portion of the evener, to which the whiffletree is attached by my improved fastening. Fig. 5 represents a cross-section of the two parts of the circle fastened together.

My improved circle may be constructed of wrought or malleable iron, and is provided with four extension-arms running at right angles from each other, and is composed of two parts, so cast or adjusted as to fit into each other. The lower half of the circle is provided with four holes, through which screws pass into the cross-bar or evener, and the upper half of the circle is fastened in a similar manner to the whiffletree. The bottom portion of the cross-arms are provided with longitudinal slots. The upper half is provided with corresponding bolt or rivet holes. The length of the longitudinal slots in the bottom of the circle depends upon the lateral motion which is desired to be given to the whiffletree, and may be longer or shorter, according to the wishes of the person using the same. The upper and lower half of the circle thus provided and fastened to the whiffletree and cross-bar or evener are then placed together and a bolt or rivet inserted in the holes or slots provided in the cross extension-arms, and secured by nuts or rivets in such a manner as to allow the bolt or rivet to loosely work in the slots in the lower half of the circle, and at the same time providing a secure and safe coupling.

If desired, the center of the circle can be provided with a hole through which a bolt can be inserted or passed, thus providing an additional means of safety.

Having described the nature and construction of my invention and discovery, I will now describe it by reference to the accompanying drawings, in which—

A represents the upper half of the circle.

B represents the lower half of the circle.

C represents the holes in the upper and lower portions of the circle, by means of which the same are fastened by screws or bolts to the whiffletree and the evener or cross-bar.

D represents the longitudinal slots in the lower half of the circle, controlling the lateral play of the whiffletree.

E represents the corresponding bolt or rivet holes in the upper half of the circle.

F represents the bolts or rivets passing through the holes E and into the slots D when they are bolted or riveted, making a secure coupling, loose enough to play easily in the longitudinal slots D.

G represents the upper projecting center of the lower portion of the circle.

S is the central pivotal bolt. T is the evener, and U is a portion of a whiffletree.

H represents a circular hole in the upper half of the circle, which fits over the projection G.

I represents a hole for a bolt through the center of the circle, and K the cross extension-arms on the lower half of the circle; K', extension-arms on the upper half of the circle.

Similar letters refer to similar parts throughout.

My invention may be applied as a means of coupling the whiffletrees to the cross-bar of wagon-shafts or to an evener, or to attach the evener to a wagon-pole.

I am aware that bolster-plates, for lumber or other heavy wagons, have heretofore been provided, constructed of iron, and adapted to form the bearing between the bolster and sand-bar of a lumber-wagon, the lower plate provided with two segmental slots on each side of the sand-board, to which the lower half is attached, provided at the center with circular boss concentric with the circular slots, the upper bolster-plate provided with circular recess on the lower side at the center, which fits over projecting boss on the lower plate, held together with bolts passing through the segmental slots in the combination, with other mechanical devices, all adapted to dispense with the necessity of a king-bolt in connecting the parts of a wagon, combinations not embraced in my invention and which I disclaim.

I am aware that it is old to provide two plates of this kind with a circular opening and corresponding projecting boss. I am also aware that such plates have been provided with semi-circular grooves and lugs to limit the movement of one plate on the other. These constructions I therefore disclaim; but I am not aware that a whiffletree-coupling of this kind has been provided with three distinct and separate locking-bolts in such a manner that any one of them would serve successfully as a draft and safety bolt, should the others be broken, and what I do claim as my invention, and desire to secure by Letters Patent, is—

In a whiffletree-fastening of the character described, the plates A and B, provided with slots and holes, and one plate having a boss, G, as described, in combination with the three headed-bolts F F and S, securing the plates together, substantially as described.

Signed at Utica, in the county of Oneida and State of New York.

WILLIAM BAILEY.

Witnesses:
WILLIAM P. QUIN,
RICHARD E. EVANS.